United States Patent
Park (10) Patent No.: US 9,592,820 B2
(45) Date of Patent: Mar. 14, 2017

(54) MOTOR TORQUE CONTROL METHOD IN COASTING STATE OF HYBRID ELECTRIC VEHICLE

(71) Applicant: Hyundai Motor Company, Seoul (KR)

(72) Inventor: Joonyoung Park, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/569,671

(22) Filed: Dec. 13, 2014

(65) Prior Publication Data
US 2016/0082942 A1 Mar. 24, 2016

(30) Foreign Application Priority Data
Sep. 24, 2014 (KR) .......................... 10-2014-0127507

(51) Int. Cl.
*B60L 9/00* (2006.01)
*B60L 11/00* (2006.01)
(Continued)

(52) U.S. Cl.
CPC ............... *B60W 20/00* (2013.01); *B60K 6/48* (2013.01); *B60L 11/14* (2013.01);
(Continued)

(58) Field of Classification Search
CPC .. B60K 6/365; B60K 6/48; B60K 2006/4825; Y10S 903/902; Y10S 903/93;
(Continued)

(56) References Cited

U.S. PATENT DOCUMENTS

2008/0017427 A1* 1/2008 Nakanowatari ........ B60K 6/365
180/65.235
2008/0306643 A1* 12/2008 Hanyu ..................... B60K 6/48
701/22
(Continued)

FOREIGN PATENT DOCUMENTS

JP 2006-118681 A 5/2006
JP 2007-168565 A 7/2007
(Continued)

*Primary Examiner* — Calvin Cheung
*Assistant Examiner* — Paula L Schneider
(74) *Attorney, Agent, or Firm* — Mintz Levin Cohn Ferris Glovsky and Popeo, P.C.; Peter F. Corless (57) ABSTRACT

A method of controlling motor torque in coasting of a vehicle includes: acquiring information about a speed of an input shaft of a transmission detected by a detector while the vehicle is running, information about an acceleration of the input shaft of the transmission obtained from the speed of the input shaft of the transmission, and information about a state of an engine clutch; determining whether the vehicle is coasting based on the acquired information; calculating a motor torque instruction based on engine friction torque corresponding to the speed of the input shaft of the transmission, a rotary inertia of an engine, and the acceleration of the input shaft of the transmission, when the vehicle is determined to be coasting with the engine clutch disengaged; and controlling torque of a driving motor for driving the vehicle in accordance with the calculated motor torque instruction.

10 Claims, 6 Drawing Sheets

(51) Int. Cl.
- *G05D 1/00* (2006.01)
- *G05D 3/00* (2006.01)
- *G06F 7/00* (2006.01)
- *G06F 17/00* (2006.01)
- *B60W 20/00* (2016.01)
- *B60K 6/48* (2007.10)
- *B60L 11/14* (2006.01)
- *B60L 15/20* (2006.01)

(52) U.S. Cl.
CPC .. *B60L 15/2054* (2013.01); *B60K 2006/4825* (2013.01); *B60L 2240/423* (2013.01); *B60L 2240/441* (2013.01); *B60L 2240/443* (2013.01); *B60L 2240/507* (2013.01); *B60L 2250/28* (2013.01); *B60L 2260/24* (2013.01); *B60W 2510/0208* (2013.01); *B60W 2510/102* (2013.01); *B60W 2510/1015* (2013.01); *B60W 2540/10* (2013.01); *Y02T 10/7258* (2013.01); *Y10S 903/902* (2013.01)

(58) Field of Classification Search
CPC ..... Y10S 903/802; B60W 20/00; B60L 11/14; B60L 15/2054; B60L 2240/423
USPC .......................................................... 701/22
See application file for complete search history.

(56) References Cited

U.S. PATENT DOCUMENTS

| | | | | |
|---|---|---|---|---|
| 2009/0124450 | A1* | 5/2009 | Silveri | B60K 6/442 477/5 |
| 2011/0312460 | A1* | 12/2011 | Nett | B60K 6/442 475/5 |
| 2012/0109477 | A1* | 5/2012 | McDonnell | B60W 10/02 701/68 |
| 2013/0073168 | A1* | 3/2013 | Jang | B60T 1/10 701/93 |
| 2013/0116906 | A1* | 5/2013 | Christen | B60W 10/02 701/93 |
| 2014/0287869 | A1* | 9/2014 | Kato | B60W 10/08 477/3 |
| 2015/0014072 | A1* | 1/2015 | Maruyama | B60K 6/445 180/65.23 |
| 2015/0111693 | A1* | 4/2015 | Wang | B60K 6/48 477/5 |

FOREIGN PATENT DOCUMENTS

| | | |
|---|---|---|
| JP | 2012-091560 A | 5/2012 |
| JP | 2012-158327 A | 8/2012 |

* cited by examiner

MOTOR TORQUE CONTROL METHOD IN COASTING STATE OF HYBRID ELECTRIC VEHICLE

CROSS-REFERENCE TO RELATED APPLICATION

This application claims under 35 U.S.C. §119(a) the benefit of and priority to Korean Patent Application No. 10-2014-0127507 filed on Sep. 24, 2014, the entire contents of which are incorporated herein by reference.

BACKGROUND (a) Technical Field

The present disclosure relates to a method of controlling motor torque of a hybrid electric vehicle. More particularly, it relates to a method of controlling torque of a driving motor in a coasting state of a hybrid electric vehicle.

(b) Background Art

Figure 1:
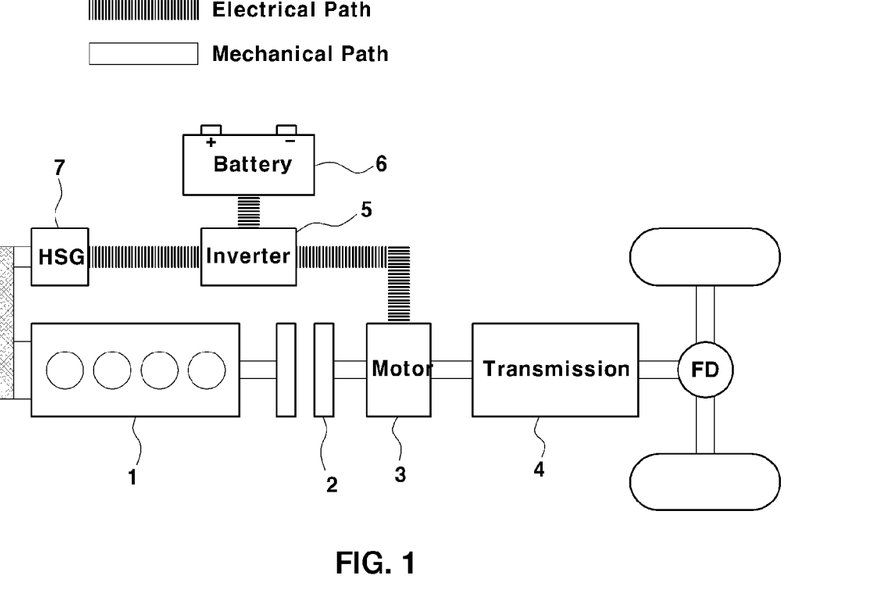
FIG. 1 is a schematic diagram showing the configuration of a power train of a common hybrid electric vehicle using an engine and a motor as driving sources.

In general, a hybrid electric vehicle, which is driven by an engine and a motor, is an environment-friendly vehicle discharging less exhaust gas with improved fuel efficiency through the use of energy from fossil fuel in combination with electric energy. In this regard, FIG. 1 is a diagram schematically showing the configuration of a powertrain including an engine and a motor, which are power sources for driving, and a transmission, in a hybrid electric vehicle. As shown in FIG. 1, a powertrain including a drive train, such as a power transmission device, in a hybrid electric vehicle includes: an engine 1 and a motor 3 (hereafter referred to as a driving motor) which are arranged in series as driving sources for driving the vehicle; an engine clutch 2 selectively connecting or disconnecting power between the engine 1 and the driving motor 3; an inverter 5 for driving and controlling the driving motor 3; a transmission 4 changing and transmitting power from the engine 1 and the driving motor 3 to a driveshaft; and a hybrid starter generator (HSG) 7 connected to the engine 1 in order to transmit the power and start the engine or generate electricity from the power from the engine. A chargeable/dischargeable battery 6 that is the power source (i.e., electric power source) for the driving motor 3 is connected to the driving motor 3 through the inverter 5.

In this configuration, the engine clutch 2 selectively connects or disconnects power between the engine 1 and the driving motor 3 by being engaged or disengaged by hydraulic pressure. The transmission 4 is connected to the output side of the driving motor 3 and transmits the power from the engine and the driving motor to the driveshaft. The inverter 5 converts the direct current of the battery 6 into alternating current and applies the alternating current to the driving motor 3 to drive the driving motor 3.

Driving modes of common hybrid electric vehicles are selected in accordance with the driving conditions. For instance, hybrid electric vehicles can be driven in an Electric Vehicle (EV) mode that is a pure electric vehicle mode using only the power from driving motor 3 and an Hybrid Electric Vehicle (HEV) mode that uses power from both of the engine 1 and the driving motor 3. Further, when the vehicles are braking (i.e., a brake pedal is depressed) or coasting by inertia, a regenerative braking (RB) mode for charging the battery 6 with the braking and inertia energy that is recovered by electric generation of the driving motor 3 can be performed. The hybrid starter generator 7 also charges the battery 6 by operating as a power generator using the power from the engine 1 or operating as a power generator in a regenerative braking condition. For reference, in hybrid electric vehicles, when the driving motor 3 is connected to the transmission 4, it is called a Transmission Mounted Electric Device (TMED) type.

Figure 2:
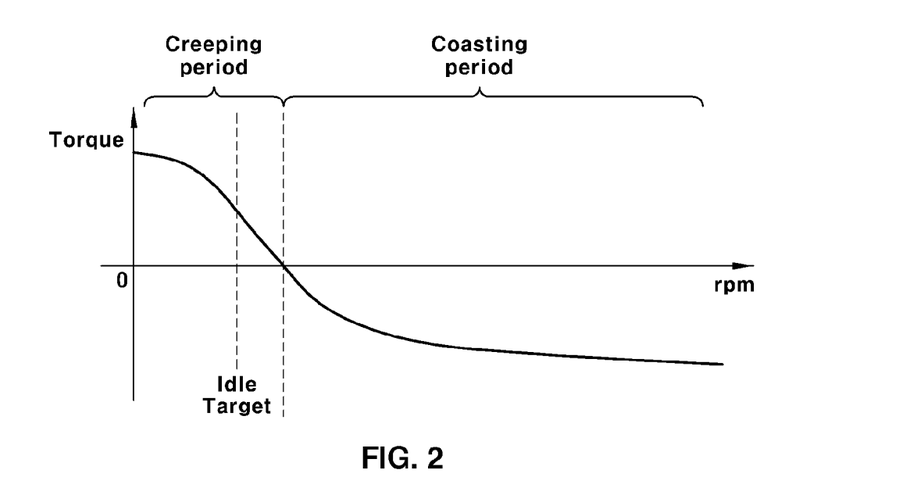
FIG. 2 is a diagram showing characteristics of creep torque and coasting torque of a common hybrid electric vehicle.

FIG. 2 is a diagram showing characteristics of creep torque and coasting torque in a hybrid electric vehicle and schematically showing an example of the state of torque (e.g., creep torque, coasting torque, etc.) of a driving motor according to a motor speed (i.e., speed of the input shaft of a transmission). As known in the art, hybrid electric vehicles creep or coast with a brake pedal-off and an accelerator pedal-off state. The term 'pedal-off' means the state when a driver does not operate the corresponding pedal, i.e., a driver takes a foot off the pedal, while the term 'pedal-on' means the state when a driver depresses the corresponding pedal.

The creep torque is implemented by an idle control characteristic of an engine and a torque converter of an automatic transmission, when a driver takes feet off a brake pedal and an accelerator pedal, i.e., in brake pedal-off and accelerator pedal-off state. In a creep period requiring creep torque, a driving force is generated by engine torque for maintaining an idling speed at a low speed.

In a coasting period at a relatively high speed, a braking force is generated by a friction force of the engine in a fuel-cut state, so the vehicle is braked by engine friction torque (i.e., engine braking torque). The torque of the driving motor in coasting (hereafter referred to as 'coasting torque'), which is negative torque, is charging torque (e.g., power generation torque, regenerative braking torque, etc.) that generates a braking force and makes the battery be charged. In a TMED hybrid electric vehicle with a driving motor connected to an automatic transmission, there is no torque converter and idle control characteristic is different, but there is a need for implementing driving comfort the same as that of common vehicles equipped with an automatic transmission.

Figure 3:
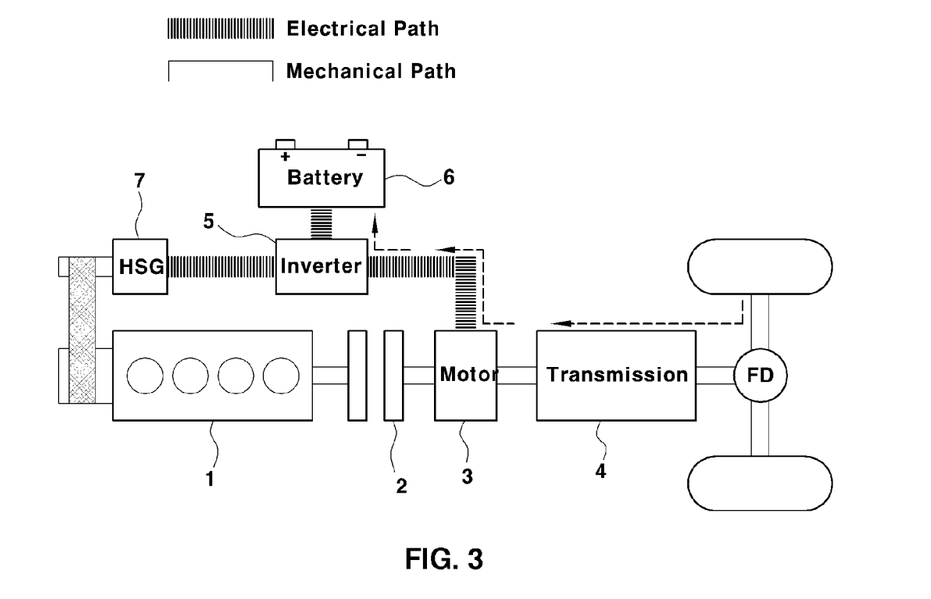
FIG. 3 is a diagram showing a state when a coasting torque is obtained by a regenerative force of a driving motor with an engine clutch disengaged in a common hybrid electric vehicle.
Figure 4:
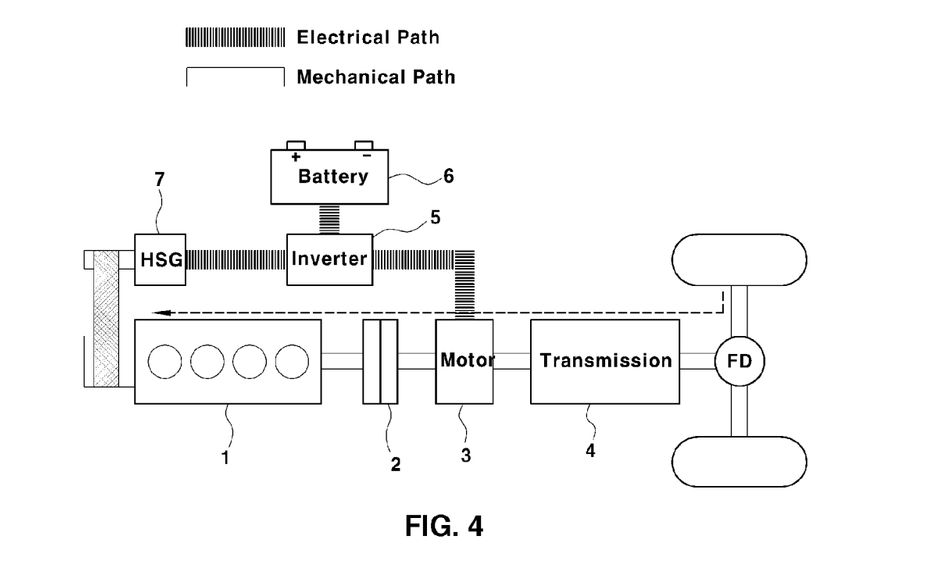
FIG. 4 is a diagram showing a state when a coasting torque is obtained by an engine friction force with an engine clutch engaged in a common hybrid electric vehicle.

FIGS. 3 and 4 are diagrams illustrating coasting torque control of a TMED hybrid electric vehicle. FIG. 3 shows a state when coasting torque is obtained by a regenerative force of the driving motor 3 in an EV mode in which a vehicle is driven by only the driving motor 3 with the engine clutch 2 disengaged. FIG. 4 shows a state when coasting torque is obtained by friction torque of an engine 1 with the engine clutch 2 engaged.

Referring to FIG. 3, when a vehicle running in an EV mode with an engine clutch disengaged starts to coast using the inertia of the vehicle without a brake pedal and an accelerator pedal depressed, regenerative power (e.g., charging power) by the driving motor 3 is stored in the battery 6 through the inverter 5. When a TMED hybrid electric vehicle is in a normal situation, as described above, the driving torque is in charge of coasting torque in the EV mode to increase driving efficiency and converts the inertia energy of the vehicle into electric energy. The motor torque (i.e., coasting torque) is controlled at engine friction torque corresponding to the current speed of the input shaft of the transmission, whereby the input speed of the transmission determines the motor speed.

When the battery 6 is fully charged, the engine clutch 2 is engaged and a braking force is generated from a friction force of the engine 1 in a fuel-cut state, as shown in FIG. 4. However, the inertia force of the vehicle depends on the rotational inertia of the engine before/after the engine clutch 2 is engaged, so there is a difference in deceleration before and after the engine cutch is engaged, when the vehicle coasts.

In more detail, first, the deceleration $\dot{\omega}_{EV}$ of a vehicle before an engine clutch is engaged (i.e., when an engine clutch is not engaged) in coasting can be obtained from the following equation (1).

$$(J_{Mot}+J_{DT}+J_{Veh})\times\dot{\omega}_{EV}=\tau_{Mot}+\tau_{DT\_Drag}+\tau_{Load} \quad (1)$$

When the torque $\tau_{Mot}$ of a driving motor is controlled at engine friction torque $\tau_{Eng\_Drag}$, that is, $\tau_{Mot}=\tau_{Eng\_Drag}$, as in the related art, the deceleration $\dot{\omega}_{EV}$ can be obtained from the following equation (2).

$$\dot{\omega}_{EV} = \frac{\tau_{Eng\_Drag} + \tau_{DT\_Drag} + \tau_{Load}}{J_{Mot} + J_{DT} + J_{Veh}} \quad (2)$$

In contrast, the deceleration $\dot{\omega}_{HEV}$ of a vehicle with an engine clutch engaged can be obtained from the following equation (3).

$$(J_{Eng}+J_{Mot}+J_{DT}+J_{Veh})\times\dot{\omega}_{HEV}=\tau_{Eng\_Drag}+\tau_{DT\_Drag}+\tau_{Load} \quad (3)$$

The deceleration $\dot{\omega}_{HEV}$ can be obtained from the following equation (4), because the rotational inertia $J_{Eng}$ of an engine is added.

$$\dot{\omega}_{HEV} = \frac{\tau_{Eng\_Drag} + \tau_{DT\_Drag} + \tau_{Load}}{J_{Eng} + J_{Mot} + J_{DT} + J_{Veh}} \quad (4)$$

In the equations (1) and (2), $J_{Eng}$ is the rotational inertia of an engine, $J_{Mot}$ is the rotational inertia of a motor, $J_{DT}$ is the rotational inertia of a drive train, and $J_{Veh}$ is the rotational inertia of a vehicle. Further, $\tau_{Mot}$ is motor torque, $\tau_{Eng\_Drag}$ is engine friction torque, $\tau_{DT\_Drag}$ is friction torque of a drive train, and $\tau_{Load}$ is driving load torque of a vehicle.

Further, $\dot{\omega}_{EV}$ is the deceleration of a vehicle coasting without an engine clutch engaged and $\dot{\omega}_{HEV}$ is the deceleration of a vehicle coasting with an engine clutch engaged. All of the rotational inertia, torque, and deceleration are values converted on the basis of the input shaft of the transmission.

As a result, as shown in equations (2) and (4), a difference in deceleration of a vehicle that is coasting, before and after an engine clutch is generated, as in the following equation (5).

$$\dot{\omega}_{EV} \neq \dot{\omega}_{HEV} \quad (5)$$

The difference in deceleration causes rapid speed change of a vehicle, and a driver feels a difference when he/she shifts, due to the difference in inertia.

The above information disclosed in this Background section is only for enhancement of understanding of the background of the disclosure, and therefore, it may contain information that does not form the related art that is already known in this country to a person of ordinary skill in the art.

SUMMARY OF THE DISCLOSURE

The present disclosure has been made in an effort to solve the above-described problems associated with related art.

Therefore, the present disclosure provides a method of controlling motor torque which can improve drivability in change of modes (e.g., EV mode↔HEV mode) without a difference in deceleration of a vehicle between a mode before an engine clutch is engaged (i.e., EV mode) and a mode after the engine clutch is engaged (i.e., HEV mode), when controlling torque of a driving motor when a hybrid electric vehicle coasts.

According to embodiments of the present disclosure, a method of controlling motor torque in coasting of a vehicle includes: acquiring information about a speed of an input shaft of a transmission detected by a detector while the vehicle is running, information about an acceleration of the input shaft of the transmission obtained from the speed of the input shaft of the transmission, and information about a state of an engine clutch; determining whether the vehicle is coasting based on the acquired information; calculating a motor torque instruction based on engine friction torque corresponding to the speed of the input shaft of the transmission, a rotary inertia of an engine, and the acceleration of the input shaft of the transmission, when the vehicle is determined to be coasting with the engine clutch disengaged; and controlling torque of a driving motor for driving the vehicle in accordance with the calculated motor torque instruction.

The motor torque instruction may derive from an equation, as follows: motor torque instruction=engine friction torque−rotary inertia of engine×acceleration of input shaft of transmission. The engine friction torque may be determined as a value corresponding to the speed of the input shaft of the transmission from a map.

When the vehicle is coasting with the engine clutch engaged, the motor torque instruction may be calculated as zero, and zero-torque control is performed on the driving motor.

It is determined whether an accelerator pedal is being operated based on information about operation of the accelerator pedal detected by an accelerator pedal detector, and when the speed of the input shaft of the transmission is greater than a predetermined critical value, it may be determined that the vehicle is coasting.

Furthermore, according to embodiments of the present disclosure, a method of controlling motor torque in coasting of a vehicle includes: acquiring information about a speed of an input shaft of a transmission detected by a detector while the vehicle is running, information about an acceleration of the input shaft of the transmission obtained from the speed of the input shaft of the transmission, and information about a state of an engine clutch; determining whether the vehicle is coasting based on the acquired information; calculating a motor torque instruction based on a rotary inertia of an engine and the acceleration of the input shaft of the transmission, when the vehicle is determined to be coasting with the engine clutch engaged; and controlling torque of a driving motor for driving the vehicle in accordance with the calculated motor torque instruction.

The motor torque instruction may derive from an equation, as follows: motor torque instruction=rotary inertia of engine×acceleration of input shaft of transmission.

When the vehicle is coasting with the engine clutch disengaged, the motor torque instruction may be calculated as equal to engine friction torque corresponding to the speed of the input shaft of the transmission.

The engine friction torque may be determined as a value corresponding to the speed of the input shaft of the transmission from a map.

It is determined whether an accelerator pedal is being operated based on information about operation of the accelerator pedal detected by an accelerator pedal detector, and when the speed of the input shaft of the transmission is greater than a predetermined critical value, it may be determined that the vehicle is coasting.

Furthermore, according to embodiments of the present disclosure, a non-transitory computer readable medium contains program instructions for performing the methods of controlling motor torque during coasting of a vehicle, as described above.

Therefore, according to the present disclosure, it is possible to remove the difference in deceleration of a vehicle due to the state of an engine clutch and to improve drivability of a vehicle by controlling torque of a driving motor in accordance with an instruction based on the speed of the input shaft of a transmission, the acceleration of the input shaft of the transmission, engine friction torque, rotary inertia of an engine, and the state of an engine clutch, while the vehicle is coasting.

Other aspects and preferred embodiments of the disclosure are discussed infra.

BRIEF DESCRIPTION OF THE DRAWINGS

The above and other features of the present disclosure will now be described in detail with reference to embodiments thereof illustrated the accompanying drawings which are given hereinbelow by way of illustration only, and thus are not limitative of the present disclosure, wherein.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment. In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the disclosure will be described in conjunction with embodiments, it will be understood that present description is not intended to limit the disclosure to those embodiments. On the contrary, the disclosure is intended to cover not only the disclosed embodiments, but also various alternatives, modifications, equivalents and other embodiments, which may be included within the spirit and scope of the disclosure as defined by the appended claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit and/or controller. The terms "control unit" or "controller" may refer to a hardware device that includes a memory and a processor. The memory is configured to store program instructions, and the processor is configured to execute the program instructions to perform one or more processes which are described further below. Moreover, it is understood that the below methods may be executed by an apparatus comprising the control unit and/or controller, whereby the apparatus is known in the art to be suitable for controlling torque of a driving motor in a coasting state of a vehicle.

Furthermore, the control unit and/or controller of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The present disclosure provides a method of controlling motor torque which can improve drivability in change of modes (EV mode⇆HEV mode) without a difference in deceleration of a vehicle between a mode before an engine clutch is engaged (EV mode) and a mode after the engine clutch is engaged (HEV mode), when controlling torque of a driving motor when a vehicle (e.g., a hybrid vehicle) coasts.

Figure 5:
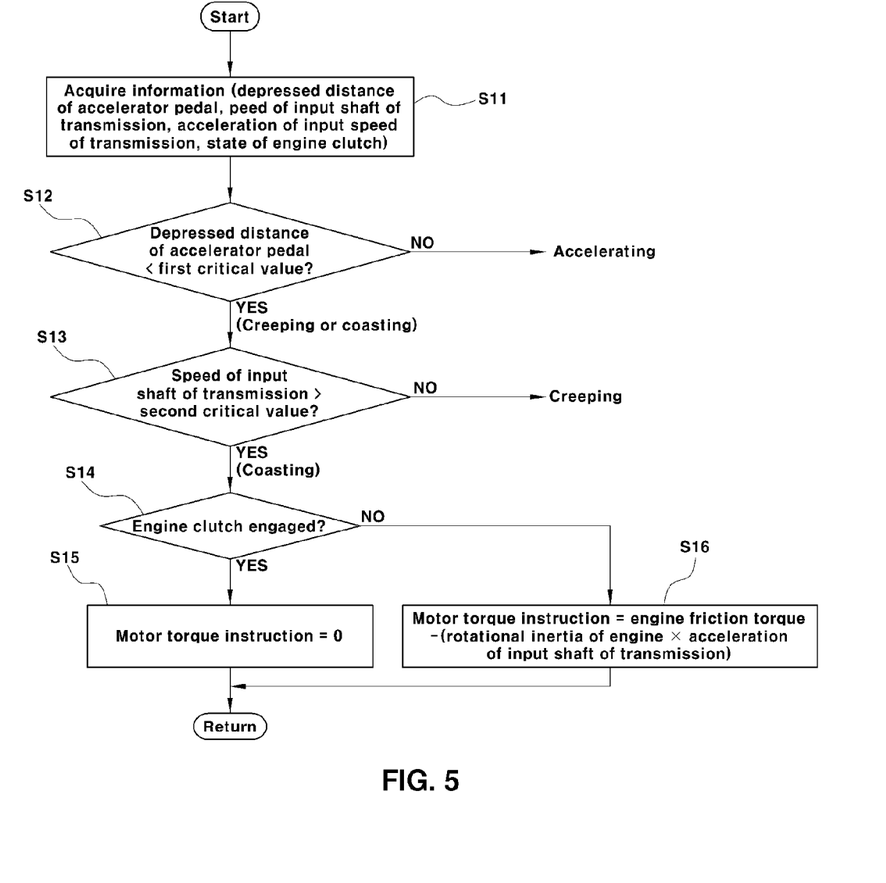
FIG. 5 is a flowchart illustrating a method of controlling motor torque according to embodiments of the present disclosure.

FIG. 5 is a flowchart illustrating a method of controlling motor torque according to embodiments of the present disclosure and shows a process of controlling torque (i.e., coasting torque) of a driving motor in accordance with whether an engine clutch is engaged, when a hybrid electric vehicle coasts.

In the following description, the main part in the process of controlling motor torque according to the disclosed embodiments may be a control unit, or a plurality of control units may perform the process of controlling a motor under control of each other. For example, a hybrid electric vehicle can be equipped with a Hybrid Control Unit (HCU) that is the highest-class control unit generally controlling the vehicle and a motor control unit controlling operation of a driving motor through an inverter, in which the HCU may determine a motor torque instruction and then the motor control unit may control torque of the driving motor in accordance with the motor torque instruction from the HCU.

First, a control unit acquires information about operation of an accelerator pedal detected by an accelerator pedal detector and information about the speed of an input shaft of a transmission (i.e., motor speed) detected by a detector in a vehicle, the acceleration of the input shaft of the transmission determined by the speed of the input shaft of the transmission, and the state of an engine clutch (S11). The accelerator pedal detector may be an accelerator pedal position sensor (APS) that detects the position of an accelerator pedal operated by a driver, for example.

The control unit checks operation of the accelerator pedal based on a signal from the accelerator pedal detector while a vehicle is running (S12). That is, it determines whether a driver has taken a foot off the accelerator pedal on the basis of a signal from the accelerator pedal detector. When it is determined whether the accelerator pedal is operated, the depressed distance of the accelerator pedal obtained from an APS signal is compared with a predetermined first critical value (S12), and then, when the depressed distance of the accelerator pedal is less than the first critical value, it is determined that a driver has taken a foot off the accelerator pedal (i.e., pedal-off).

If a driver operates the accelerator pedal to accelerate the vehicle, i.e., when the depressed distance of the accelerator pedal obtained from an APS signal is greater than the first critical value, it means the driver has operated the accelerator pedal to accelerate the vehicle, so common vehicle acceleration control with an accelerator pedal operated is performed. Conversely, when it is determined that the accelerator pedal is not depressed in step S12, the controller compares the speed of the input shaft of a transmission to a predetermined second critical value (S13), and when the speed of the input shaft of a transmission is greater than the second critical value, it determines that the vehicle is coasting.

If the speed of the input shaft of a transmission is less than the second critical value in step S13, the controller performs common creeping control. Further, when it is determined that the vehicle is coasting in step S13, the state of the engine clutch is checked (S14) and coasting control according to the state of the engine clutch is performed, in which a motor torque instruction depends of whether the engine clutch is engaged. When the engine clutch has been engaged, a motor torque instruction is calculated as zero, zero-torque control is performed on the driving motor (15) so that the engine in a fuel-cut state directly provides a friction load and an inertial load. That is, a braking force is generated by the friction force of the engine, and as a result, the vehicle is braked by the engine friction torque (i.e., braking torque of the engine) such as engine brake.

In contrast, when the engine clutch has been disengaged, a motor torque instruction is calculated on the basis of the engine friction torque, the rotary inertia of the engine, and the acceleration of the input shaft of the transmission (S16) and the torque (i.e., coasting torque) of the driving motor is controlled in accordance with the calculated motor torque instruction. The engine friction torque can be obtained based on the speed of the input shaft of the transmission in a map that is set and input in advance in the controller, and the rotary inertia of the engine is set and input in advance in the controller as an eigen value of the engine.

Figure 6:
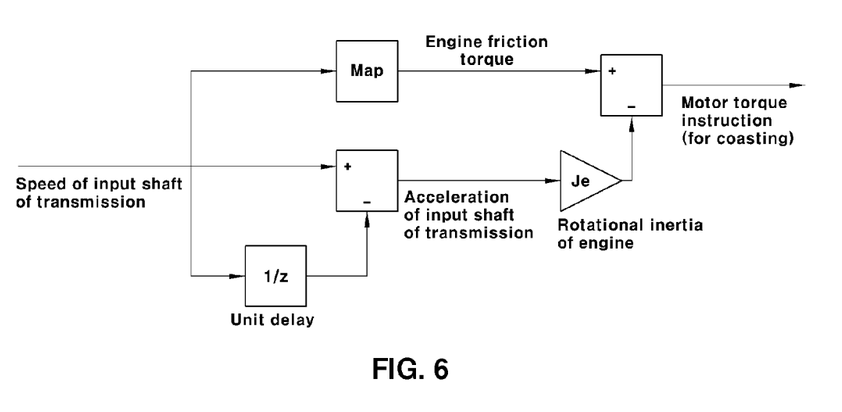
FIG. 6 is a block diagram illustrating a method of determining motor torque when the engine clutch is disengaged in the embodiment of FIG. 5.

Further, the acceleration of the input shaft of the transmission, a value determined based on the speed of the input shaft of the transmission, may be determined by differentiating the speed of the input shaft of the transmission, or as shown in FIG. 6, it may be determined based on the difference between the speed of the input shaft of the transmission at the previous sampling time and the speed of the input shaft of the transmission at the current sampling time and the value z of the sampling period.

The motor torque instruction in coasting in step S16 may be calculated by the following Equation (6).

$$\text{motor torque instruction} = \text{engine friction torque} - \text{rotary inertia of engine} \times \text{acceleration of input shaft of transmission} \qquad (6)$$

Figure 7:
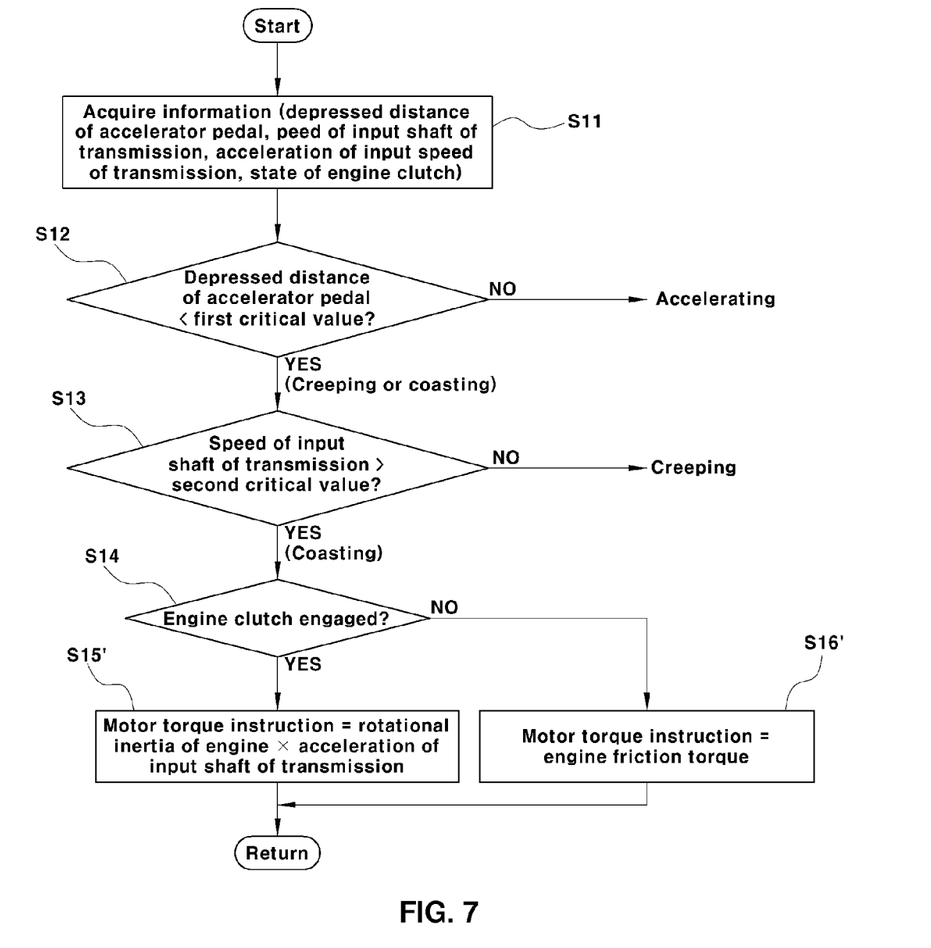
FIG. 7 is a flowchart illustrating a method of controlling motor torque according to embodiments of the present disclosure.

FIG. 7 is a flowchart illustrating a method of controlling motor torque according to embodiments of the present disclosure, and steps S11 to S14 are the same as those of the embodiments described with reference to FIG. 5, so they are not described.

Figure 8:
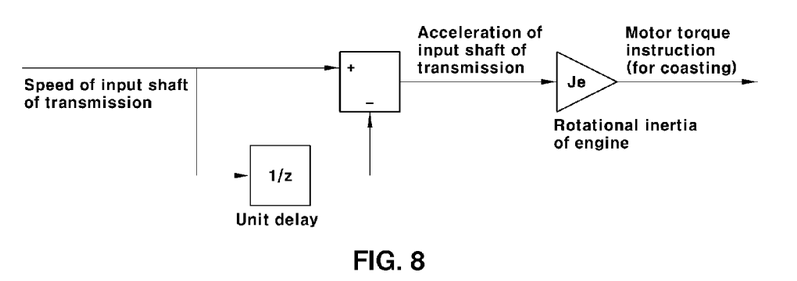
FIG. 8 is a block diagram illustrating a method of determining motor torque when the engine clutch is engaged in the embodiment of FIG. 7.

In the embodiments shown in FIG. 7 as well, a motor torque instruction depends on whether an engine clutch is engaged while a vehicle coasts. That is, when an engine clutch has been engaged, a motor torque instruction can be calculated on the basis of the rotary inertia of the engine and the acceleration of the input shaft of the transmission (S15), by the following Equation (7), as in FIG. 8.

$$\text{motor torque instruction} = \text{rotary inertia of engine} \times \text{acceleration of input shaft of transmission} \qquad (7)$$

The controller recognizes the rotary inertia of the engine as the eigen value of the engine, and the acceleration of the input shaft of the engine can be found in the same way as described above.

With the engine clutch engaged, as described above, a friction load and an inertia load may be generated by the transmission in a fuel-cut state, but the inertia load is offset by the motor torque. On the contrary, when the engine clutch is not engaged, the motor torque instruction may be calculated as equal to the engine friction torque that is determined on the basis of the speed of the input shaft of the transmission, as in the following Equation (8) (S16), and the engine friction torque may be obtained on the basis of the speed of the input shaft of the transmission from a map that is set and input in advance in the controller.

$$\text{motor torque instruction} = \text{engine friction torque} \qquad (8)$$

Therefore, the torque (i.e., coasting torque) of the driving motor is controlled on the basis of the motor torque instruction calculated from the Equation (7) or (8), in accordance with whether the engine clutch is engaged.

The contents of the disclosure have been described in detail with reference to embodiments thereof. However, it will be appreciated by those skilled in the art that changes may be made in these embodiments without departing from the principles and spirit of the disclosure, the scope of which is defined in the appended claims and their equivalents.

What is claimed is:

1. A method of controlling motor torque during coasting of a vehicle, the method comprising:
    acquiring, by a controller including a memory and a processor, information about a speed of an input shaft of a transmission detected by a detector while the vehicle is running, information about an acceleration of the input shaft of the transmission obtained from the speed of the input shaft of the transmission, and information about a state of an engine clutch;
    determining, by the controller, whether the vehicle is coasting based on the acquired information;
    calculating, by the controller, a motor torque instruction based on engine friction torque corresponding to the speed of the input shaft of the transmission, a rotary inertia of an engine, and the acceleration of the input shaft of the transmission, when the vehicle is determined to be coasting with the engine clutch disengaged; and
    controlling, by the controller, torque of a driving motor for driving the vehicle in accordance with the calculated motor torque instruction, wherein the motor torque instruction derives from an equation, as follows:
    motor torque instruction=engine friction torque−(rotary inertia of engine×acceleration of input shaft of transmission).

2. The method of claim 1, wherein the engine friction torque is determined by the controller as a value corresponding to the speed of the input shaft of the transmission from a map.

3. The method of claim 1, wherein when the vehicle is coasting with the engine clutch engaged, the motor torque instruction is calculated by the controller as zero, and zero-torque control is performed on the driving motor.

4. The method of claim 1, wherein it is determined by the controller whether an accelerator pedal is being operated based on information about operation of the accelerator pedal detected by an accelerator pedal detector, and when the speed of the input shaft of the transmission is greater than a predetermined value, it is determined by the controller that the vehicle is coasting.

5. A method of controlling motor torque during coasting of a vehicle, the method comprising:
    acquiring, by a controller including a memory and a processor, information about a speed of an input shaft of a transmission detected by a detector while the vehicle is running, information about an acceleration of the input shaft of the transmission obtained from the speed of the input shaft of the transmission, and information about a state of an engine clutch;
    determining, by the controller, whether the vehicle is coasting based on the acquired information;
    calculating, by the controller, a motor torque instruction based on a rotary inertia of an engine and the acceleration of the input shaft of the transmission, when the vehicle is determined to be coasting with the engine clutch engaged; and
    controlling, by the controller, torque of a driving motor for driving the vehicle in accordance with the calculated motor torque instruction, wherein the motor torque instruction derives from an equation, as follows:
    motor torque instruction=rotary inertia of engine×acceleration of input shaft of transmission.

6. The method of claim 5, wherein when the vehicle is coasting with the engine clutch disengaged, the motor torque instruction is calculated by the controller as equal to engine friction torque corresponding to the speed of the input shaft of the transmission.

7. The method of claim 6, wherein the engine friction torque is determined by the controller as a value corresponding to the speed of the input shaft of the transmission from a map.

8. The method of claim 5, wherein it is determined by the controller whether an accelerator pedal is being operated based on information about operation of the accelerator pedal detected by an accelerator pedal detector, and when the speed of the input shaft of the transmission is greater than a predetermined value, it is determined by the controller that the vehicle is coasting.

9. A non-transitory computer readable medium containing program instructions executable by a controller including a memory and a processor for controlling motor torque during coasting of a vehicle, the computer readable medium comprising:
    program instructions that acquire information about a speed of an input shaft of a transmission detected by a detector while the vehicle is running, information about an acceleration of the input shaft of the transmission obtained from the speed of the input shaft of the transmission, and information about a state of an engine clutch;
    program instructions that determine whether the vehicle is coasting based on the acquired information;
    program instructions that calculate a motor torque instruction based on engine friction torque corresponding to the speed of the input shaft of the transmission, a rotary inertia of an engine, and the acceleration of the input shaft of the transmission, when the vehicle is determined to be coasting with the engine clutch disengaged; and
    program instructions that control torque of a driving motor for driving the vehicle in accordance with the calculated motor torque instruction, wherein the motor torque instruction derives from an equation, as follows:
    motor torque instruction=engine friction torque−(rotary inertia of engine×acceleration of input shaft of transmission).

10. A non-transitory computer readable medium containing program instructions executable by a controller including a memory and a processor for controlling motor torque during coasting of a vehicle, the computer readable medium comprising:
    program instructions that acquire information about a speed of an input shaft of a transmission detected by a detector while the vehicle is running, information about an acceleration of the input shaft of the transmission obtained from the speed of the input shaft of the transmission, and information about a state of an engine clutch;
    program instructions that determine whether the vehicle is coasting based on the acquired information;
    program instructions that calculate a motor torque instruction based on a rotary inertia of an engine and the acceleration of the input shaft of the transmission, when the vehicle is determined to be coasting with the engine clutch engaged; and
    program instructions that control torque of a driving motor for driving the vehicle in accordance with the calculated motor torque instruction, wherein the motor torque instruction derives from an equation, as follows:

motor torque instruction=rotary inertia of engine×acceleration of input shaft of transmission.

* * * * *